US011919734B2

(12) United States Patent
Summerer et al.

(10) Patent No.: US 11,919,734 B2
(45) Date of Patent: Mar. 5, 2024

(54) METHOD AND APPARATUS FOR SEPARATING BLANKS

(71) Applicant: SCHULER PRESSEN GMBH, Göppingen (DE)

(72) Inventors: Matthias Summerer, Altdorf (DE); Alexander Seitz, Erlangen (DE)

(73) Assignee: SCHULER PRESSEN GMBH, Göppingen (DE)

( * ) Notice: Subject to any disclaimer, the term of this patent is extended or adjusted under 35 U.S.C. 154(b) by 0 days.

(21) Appl. No.: 17/917,067

(22) PCT Filed: Apr. 19, 2021

(86) PCT No.: PCT/EP2021/060113
§ 371 (c)(1),
(2) Date: Oct. 5, 2022

(87) PCT Pub. No.: WO2021/213990
PCT Pub. Date: Oct. 28, 2021

(65) Prior Publication Data

US 2023/0146251 A1 May 11, 2023

(30) Foreign Application Priority Data

Apr. 24, 2020 (DE) ..................... 10 2020 111 238.6

(51) Int. Cl.
*B65H 29/24* (2006.01)
*B26D 1/01* (2006.01)
*B65H 29/32* (2006.01)

(52) U.S. Cl.
CPC ........... *B65H 29/241* (2013.01); *B26D 1/015* (2013.01); *B65H 29/32* (2013.01);
(Continued)

(58) Field of Classification Search
CPC .................. B65H 29/241; B65H 29/32; B65H 2301/4473; B65H 2406/351;
(Continued)

(56) References Cited

U.S. PATENT DOCUMENTS

| | | | |
|---|---|---|---|
| 3,476,241 A | 11/1969 | Ungerer |
| 2004/0011446 A1 | 1/2004 | Boulot |

(Continued)

FOREIGN PATENT DOCUMENTS

| | | |
|---|---|---|
| DE | 1282556 B | 11/1968 |
| DE | 10064888 A1 | 5/2002 |

(Continued)

OTHER PUBLICATIONS

PCT/ISA/210, "International Search Report for PCT International Application No. PCT/EP2021/060113," dated Jul. 23, 2021.

*Primary Examiner* — Lee A Holly
(74) *Attorney, Agent, or Firm* — Manabu Kanesaka

(57) ABSTRACT

A method for separating blanks includes continuous conveying of a sheet metal strip in a transport direction to a laser cutting station, concurrent cutting of the sheet metal strip by at least one cutting laser, wherein a cut sheet metal strip is formed from successive sections of the same cutting geometry, transporting the cut sheet metal strip on a first conveyor belt in the transport direction, taking over the cut sheet metal strip from the first conveyor belt, transporting the cut sheet metal strip in the transport direction, separately ejecting the at least one residual blank of each section, transporting the at least one blank of each section into overlap with a second conveyor belt and ejecting the at least one blank from the suction conveyor, and transporting the blanks ejected one after the other from the suction conveyor horizontally in the transport direction to a collecting station.

17 Claims, 5 Drawing Sheets

(52) U.S. Cl.
CPC ................ *B65H 2301/4473* (2013.01); *B65H 2406/351* (2013.01); *B65H 2406/365* (2013.01); *B65H 2701/173* (2013.01)

(58) Field of Classification Search
CPC ........ B65H 2406/365; B65H 2701/173; B65H 2406/3124; B65H 2701/1113; B65H 2701/12422; B65H 29/64; B65H 2406/364; B26D 1/015
See application file for complete search history.

(56) References Cited

U.S. PATENT DOCUMENTS

| | | | | |
|---|---|---|---|---|
| 2004/0108305 | A1* | 6/2004 | Harnisch ............ | B23K 26/0846 219/121.72 |
| 2016/0136715 | A1 | 5/2016 | Liebel et al. | |
| 2016/0318126 | A1 | 11/2016 | Okazaki | |
| 2017/0355528 | A1 | 12/2017 | Folke | |

FOREIGN PATENT DOCUMENTS

| | | | |
|---|---|---|---|
| DE | 102010042067 | A1 | 2/2012 |
| DE | 102013210878 | A1 | 12/2014 |
| EP | 0607761 | A1 | 7/1994 |
| EP | 1335838 | B1 | 10/2004 |
| EP | 2709807 | B1 | 3/2016 |
| EP | 3254992 | A1 | 12/2017 |
| WO | 2009/105608 | A1 | 8/2009 |
| WO | 2010/085486 | A1 | 7/2010 |

* cited by examiner

METHOD AND APPARATUS FOR SEPARATING BLANKS

RELATED APPLICATIONS

The present application is National Phase of International Application No. PCT/EP2021/060113 filed Apr. 19, 2021, and claims a priority from German Patent Application No. DE 10 2020 111 238.6 filed Apr. 24, 2020, the disclosure of which is hereby incorporated by reference herein in its entirety.

The invention relates to a method and an apparatus for separating blanks.

A method and an apparatus for separating blanks are known from US 2016/0318126 A1. A sheet metal strip is continuously transported in a transport direction to a laser cutting station. In the laser cutting station, the sheet metal strip is cut continuously by means of at least one cutting laser. A cut sheet metal strip is formed, which comprises the blanks and residual blanks adjacent to the blanks. The cut sheet metal strip is transported downstream of the laser cutting station on a first conveyor belt in the transport direction. The blanks are then lifted off the first conveyor belt by a robot and fed to a collecting station, for example a stacker.

To lift off the blanks by means of the robot, it is necessary to attach a specific suction tool adapted to the geometry of the respective blank to the end of the robot arm. If the geometry of the blank is changed, either the suction tool must be adapted accordingly or a different suction tool must be attached to the end of the robot arm. This is time-consuming and costly.

To achieve the highest possible production rate of blanks, the sheet metal strip is usually transported through the laser cutting station so quickly that several robots are required to lift off the blanks. This further increases the expense as well as the space requirement of the known apparatus.

WO 2009/105608 A1 discloses a process for cutting blanks. In this process, a continuously conveyed sheet metal strip is cut in a transport direction by means of two laser cutting stations. A first laser cutting station is located at the entrance of a first conveying device, a second laser cutting station is located at the exit of a second conveying device. The sheet metal strip is cut into blanks by means of the laser cutting stations. The blanks are then transported away in the transport direction.

DE 1 282 556 describes a device for selectively conveying and stacking blanks fed one after the other at a distance. The blanks are fed to different stacking positions depending on a measured thickness. The known device is only suitable for selective conveying and stacking of blanks with a uniform predetermined geometry.

It is the object of the invention to eliminate the disadvantages of the prior art. In particular, a method and an apparatus are to be specified with which blanks and adjacent residual blanks can be separated from one another with reduced effort, and the blanks can be separated. According to a further objective of the invention, the manufacturing rate for producing the blanks is to be increased.

The object is solved by the features of claims 1 and 10. Expedient embodiments of the invention result from the features of the dependent claims.

According to the invention, a method for separating blanks is proposed comprising the following steps:

continuous conveying of a sheet metal strip in a transport direction to a laser cutting station, concurrently cutting said sheet metal strip by means of at least one cutting laser, wherein a cut sheet metal strip is formed of successive sections of the same cutting geometry, each of said sections comprising at least one blank and at least one residual blank adjacent to said blank, transporting the cut sheet metal strip on a first conveyor belt in the transport direction, transfer of the cut sheet metal strip from the first conveyor belt by means of a suction conveyor operated by negative pressure, hanging transport of the cut sheet metal strip by means of the suction conveyor in the transport direction, separately jettisoning the at least one residual board of each section by first interrupting the negative pressure in predetermined areas of the suction conveyor, transporting the at least one blank of each section into overlap with a second conveyor and ejecting the blanks from the suction conveyor by a second interruption of the negative pressure, and horizontal transport of the blanks dropped one after the other by the suction conveyor in the direction of transport to a collecting station.

The sheet metal strip is repeatedly cut into sections with a predetermined length extending in the direction of transport. The specified length is also referred to as the "pitch length".

Each section has the same cutting geometry. This means that in each of the sections, the cutting geometry forms a pattern which is repeated in the following section in an identical or almost identical manner.

Within a section, at least one blank and a residual blank adjacent thereto are produced by at least one cut. The at least one blank and the at least one residual blank usually have a different geometry from each other. The at least one blank formed in each of the sections forms a so-called "good part", whereas the residual blank is discarded as scrap.

With the given invention, it is advantageously possible to separate the one board from the at least one residual board within one section without great technical effort.

In a departure from the prior art, the blanks and at least some of the remnant blanks or the cut sheet strip are taken over by a suction conveyor from the first conveyor belt and transported suspended in the transport direction. During the hanging transport of the blanks, only the residual blanks are discharged from the suction conveyor. The blanks are first transported suspended in overlap with a second conveyor belt and then discharged from the suction conveyor onto the second conveyor belt by a second interruption of the negative pressure.

It is no longer necessary to provide robots with suction tools specifically adapted to the geometry of the blanks for separating them. The proposed suction conveyor allows residual blanks of any geometry to be discharged without having to modify its design. Advantageously, the suction conveyor can be operated at the same transport speed as the first conveyor. If, for example, the transport speed of the first conveyor belt is increased to increase the production rate for geometrically simple blanks, the transport speed of the suction conveyor can be adapted accordingly without further ado.

A suitable suction conveyor is known, for example, from EP 1 355 838 B1. In the known suction conveyor, a negative pressure channel is provided between two parallel conveyor belts. With sheet metal parts lying on the conveyor belts, a dynamic negative pressure is formed in the negative pressure channel according to the Venturi principle, whereby the sheet metal parts are drawn to the conveyor belts.

To carry out the process according to the invention, several suction conveyors arranged next to each other in a y-direction running perpendicular to the transport direction are advantageously used. A distance between the suction conveyors can be varied in the y-direction so that the suction conveyor can be adapted to the geometry of the blanks and/or remnant blanks.

According to an advantageous embodiment, the suction conveyor has a plurality of compressed air blast devices for interrupting the negative pressure, which are arranged successively in the transport direction and in the y-direction extending transversely to the transport direction, each compressed air blast device being optionally connectable to a compressed air source via a separately controllable valve for generating a compressed air blast. The suction conveyor thus has a two-dimensional array of compressed air blast devices which can be controlled selectively and separately as a function of a predetermined geometry of the at least one residual blank for ejecting the same.

The negative pressure is advantageously interrupted by generating a surge of compressed air produced by means of a compressed air blast device. As a result, a device for generating the negative pressure can advantageously be operated continuously and used to supply the remaining areas of the suction conveyor.

According to a further advantageous embodiment, specific compressed air blast devices are selected in a CAM system set up for the production of the blanks as a function of a geometry of the at least one residual blank and transferred to a controller. In the CAM system, for example, the at least one residual blank and/or the at least one blank can be marked. A suitable computer program is then used to select the compressed air blast devices corresponding to a discharge of the respective residual blanks. The information on the selected compressed air blast devices is transferred to a control system or machine controller. This enables fast and simple programming for separating the blanks.

Advantageously, the selected compressed air blast devices for ejecting the at least one residual blank are controlled by the control system as a function of the transport path of the sheet metal strip for generating a compressed air blast. In other words, the control system controls the selected compressed air blast devices for generating a compressed air blast precisely when the sheet metal strip has covered a specific transport path in the transport direction. The transport path is advantageously dimensioned so that the residual sheet to be ejected is then located exactly opposite the selected compressed air blast devices of the suction conveyor. The negative pressure is interrupted by activating the compressed air blast devices and the residual blank is ejected from the suction conveyor.

It is expedient to discharge the remnant blanks into a remnant blank discharge device, which is arranged between the first and the second conveyor belt. In the remnant blank discharge device, the remnant blanks are suitably comminuted by means of a comminution device. The shredded remnant blanks can then be fed to a scrap container by means of a conveyor belt.

According to a particularly advantageous embodiment of the invention, a first transport speed of the first conveyor belt and the suction conveyor is lower than a second transport speed of the second conveyor belt. That is, the blanks taken over by the second conveyor belt are accelerated. As a result, a distance between the blanks placed one after the other on the second conveyor is greater than in the cut sheet belt. This simplifies handling of the blanks, for example collecting, stacking and the like.

Conveniently, the blanks are stacked in a collecting station provided downstream of the second conveyor. The collecting station can also comprise several stackers which alternately pick up blanks.

According to a further provision of the invention, an apparatus for separating blanks is proposed, comprising:

- a conveying device for continuously conveying a sheet metal strip in a transport direction to a laser cutting station,
- a laser cutting station having at least one cutting laser for concurrently cutting said sheet metal strip so that a cut sheet metal strip is formed from successive sections of the same cutting geometry, each of said sections comprising at least one blank and at least one residual blank adjacent to said blank,
- a first conveyor belt for transporting the cut sheet metal strip downstream of the laser cutting station in the transport direction,
- a suction conveyor operated by means of negative pressure for taking over the cut sheet metal strip from the first conveyor belt and for transporting the cut sheet metal strip overhead in the transport direction,
- a device for separately ejecting the at least one residual blank of each section by first interrupting the negative pressure in predetermined areas of the suction conveyor,
- a second conveyor belt arranged in partial overlap with the suction conveyor for receiving the at least one blank discharged from the suction conveyor by a second interruption of the negative pressure and for transporting the successively discharged blanks horizontally in the transport direction to a collecting station.

The conveying device can be, for example, a roll straightener and/or a pair of transport rolls facing each other. A laser cutting station with at least one cutting laser for concurrent cutting of a sheet metal strip is generally known in the prior art. Reference is made by way of example to DE 10 2010 042 067 A1 and WO 2009/105608 A1.

For the design of the suction conveyor, please refer to the previous explanations. Several transport devices arranged side by side in the y-direction can be used, as known, for example, from EP 1 335 838 B1. According to the invention, the known transport devices are modified in such a way that they have a plurality of compressed air blast devices arranged one behind the other in the transport direction. By arranging a plurality of transport devices side by side in the y-direction, an array of compressed air blast devices is obtained which extends in the transport direction and in the y-direction. The compressed air blast devices thus form a two-dimensional array. For the ejection of residual blanks, sections of the array which overlap with the respective residual blank can be controlled to generate compressed air blasts.

For further embodiments of the apparatus, reference is made to the preceding explanations of the features of the method, which also constitute features of the apparatus mutatis mutandis.

In the following, an embodiment of the invention is explained in more detail with reference to the drawings. It shows:

FIG. 1 a block diagram of an apparatus,
FIG. 2 a perspective view of a suction conveyor,
FIG. 3 a sectional view according to FIG. 2,
FIG. 4 a top view according to FIG. 2, FIG. 5 a detailed view according to FIG. 3, FIG. 6 a detailed view according to FIG. 5, FIG. 7 a first sectional view through a compressed air blast device, FIG. 8 a sectional view according to section line A-A in FIG. 7, FIG. 9 a sheet metal strip with a first cutting contour and FIG. 10 a sheet metal strip with a second cutting contour.

FIG. 1 shows a block diagram of an apparatus for separating blanks. Reference sign 1 designates a conveying apparatus, which may be a roller leveler, for example. Reference sign 2 designates a sheet metal strip which is fed to a laser cutting station 3. In the laser cutting station 3, the sheet metal strip is cut into blanks P and adjacent residual blanks RP. The cut sheet metal strip 2 is transported in transport direction T by a first conveyor belt 4 provided downstream of the laser cutting station 3.

Reference sign 5 indicates a suction conveyor which is arranged downstream of the first conveyor belt 4. The blanks P and the residual blanks RP are picked up by the suction conveyor 5 and transported in the transport direction T in a suspended position.

Reference sign 6 designates a second conveyor belt, which is arranged downstream of the suction conveyor 5. The second conveyor belt 6 feeds the separated blanks P to a downstream collecting station 7. The residual blanks RP are shredded in a shredding device (not visible here) and discharged as scrap S.

FIGS. 2 to 5 show in detail the arrangement of the first conveyor belt 4, the suction conveyor 5 and the second conveyor belt 6. The suction conveyor 5 is formed by a plurality of suction conveyors 7*a* arranged side by side in the y-direction. FIGS. 3 and 5 each show sectional views through one of the suction conveyors.

Each of the suction conveyors 7*a* has two circulating conveyor belts 8 arranged parallel to one another, between which a negative pressure channel 9 is located. A plurality of suction lines 10, which—as shown in the figures—may be branched, extend one behind the other from the negative pressure channel 9 in the transport direction T. The suction lines 10 terminate opposite the negative pressure channel 9 in a suction channel 11 (see FIGS. 7 and 8).

As can be seen in particular from FIG. 5, the suction conveyor 5 is arranged such that a first section A1 is located substantially between the first conveyer belt 4 and the second conveyor belt 6. A second section A2 of the suction conveyor 5 extends downstream of the first section A1 and covers the second conveyor belt 6 in sections.

In the first section A1, a greater number of suction lines 10 per unit length are provided in the transport direction T than in the second section A2.

As can be seen in particular from FIGS. 7 and 8, a compressed air line 11*a* opens into each of the suction lines 10, which is connected to a compressed air source (not shown here). A valve (not shown here) is connected to each compressed air line 11*a*, so that each of the suction lines 10 can be selectively and separately supplied with compressed air.

In FIGS. 2 and 3, the reference sign 12 indicates a shredding device which is provided at the end of a sliding surface 13. The sliding surface 13 extends from the downstream end of the first conveyor belt 4 downward toward the shredding device 12.

Figure 10:
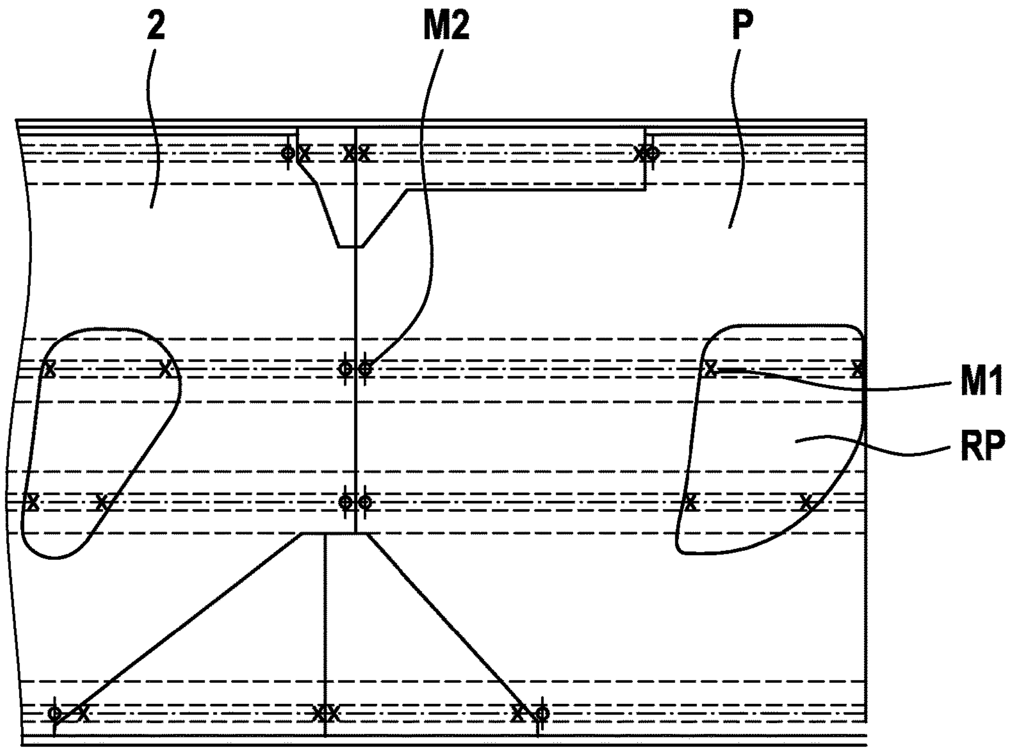
FIG. 10 shows a second cutting contour of a sheet metal strip 2. Here, relatively large residual blanks RP are provided within the blanks P.

The function of the apparatus is as follows:

First, a CAM system is used to manually set marks M1, M2 (see FIG. 10) to determine which sections of the cut sheet metal strip 2 are residual blanks RP to be discarded. For this purpose, e.g. crosses are set as first marks M1 within the residual blanks RP. The blanks P, on the other hand, are marked with second marks M2, which in FIG. 10 are circles, for example.

Figure 1:
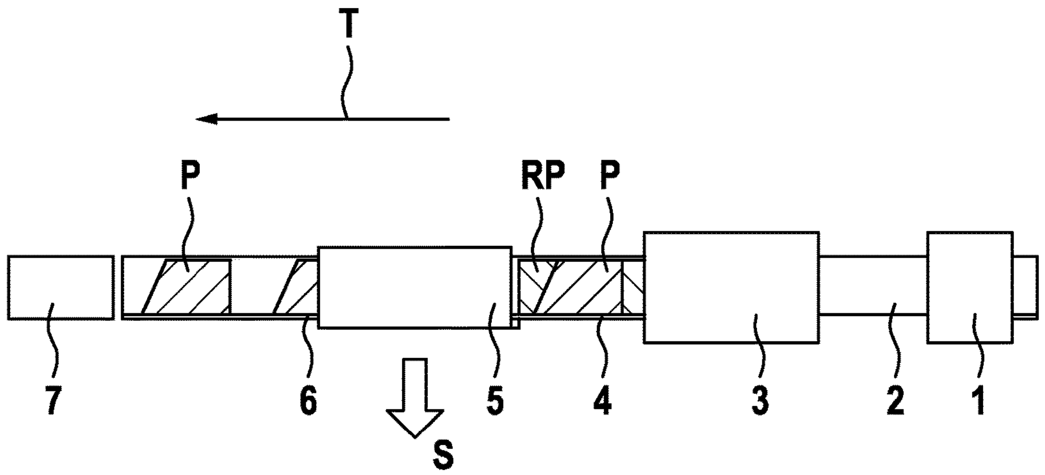
Figure 2:
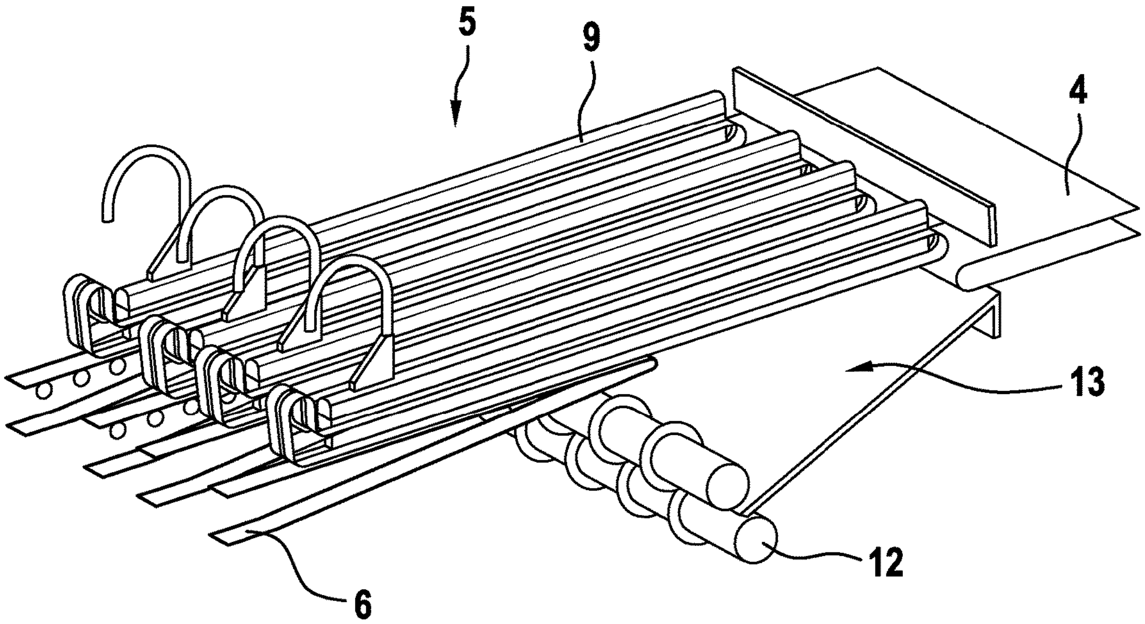
Figure 3:
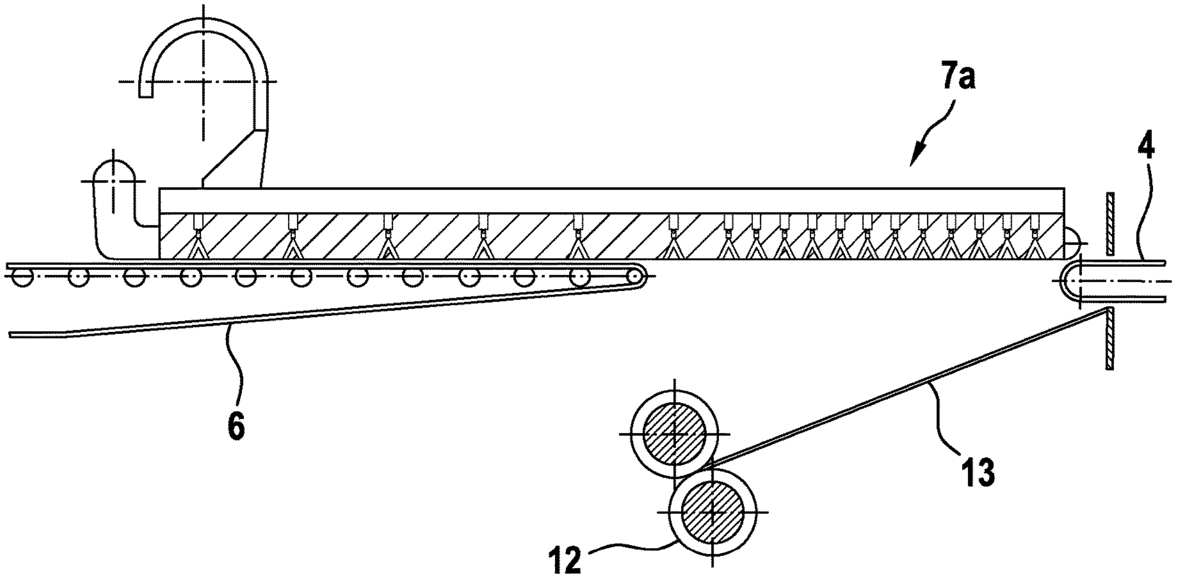
Figure 4:
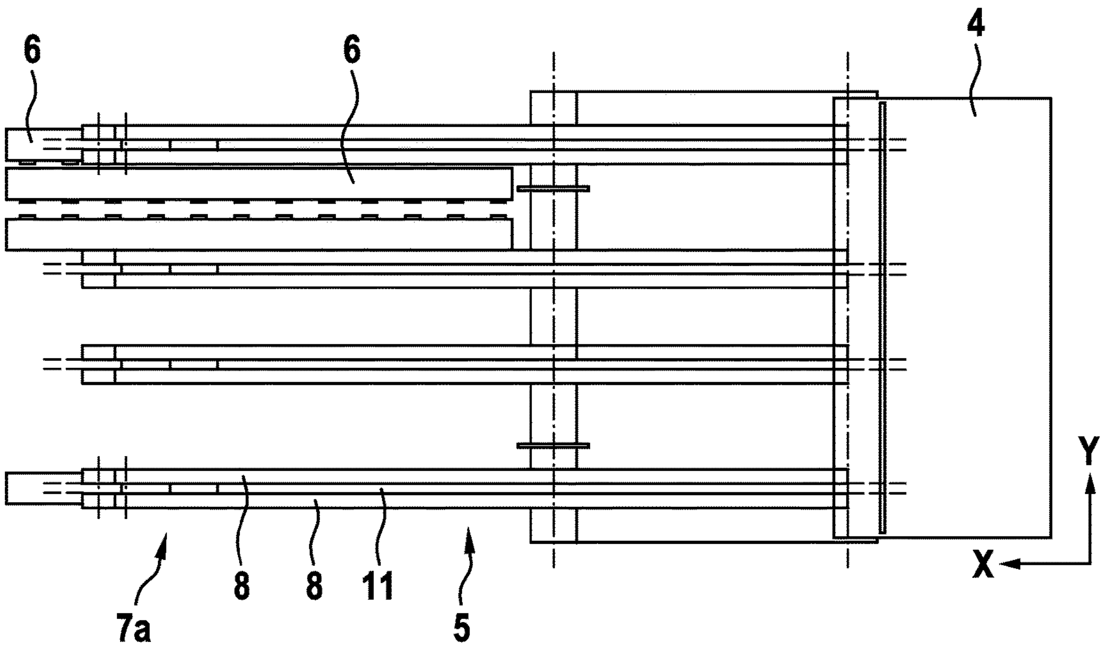
Figure 5:
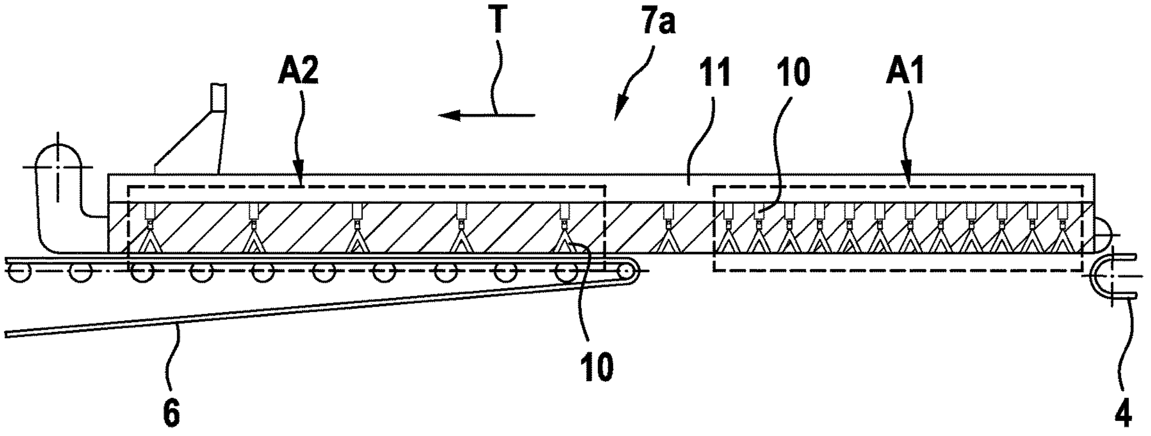
Figure 6:
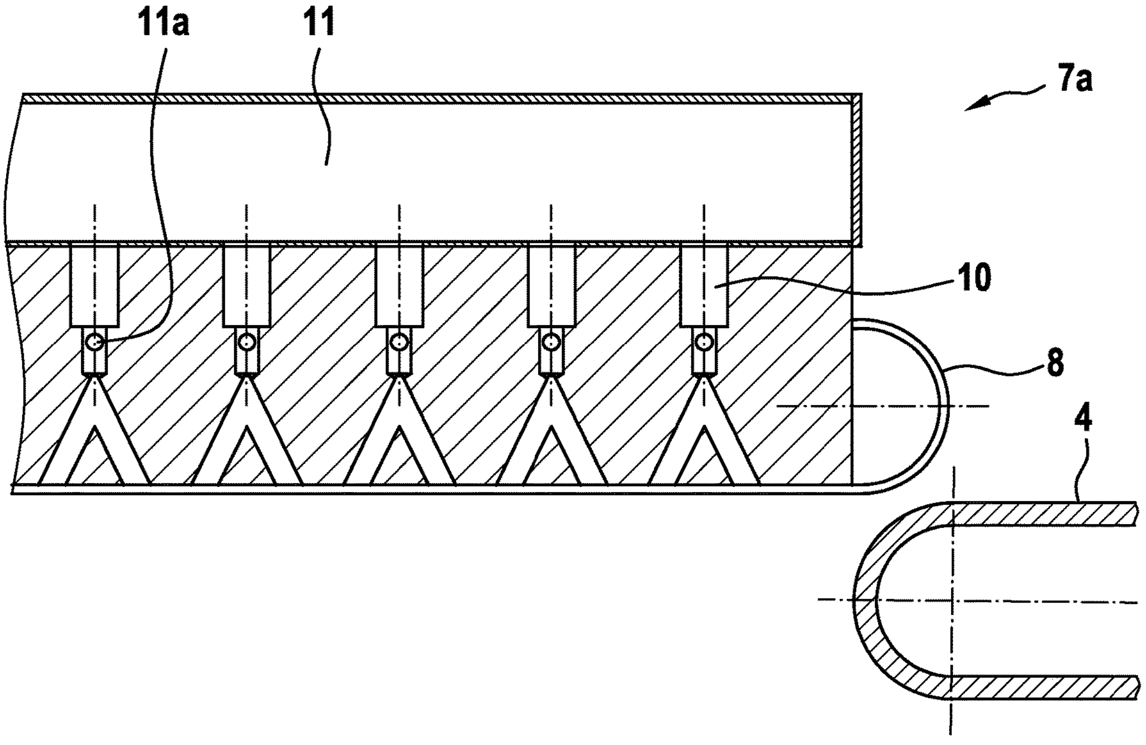
Figure 7:
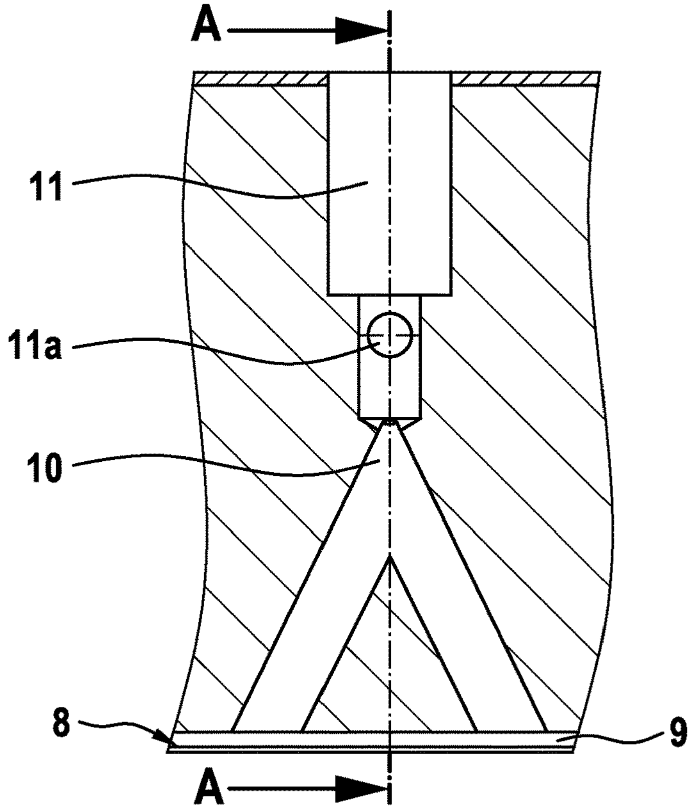
Figure 8:
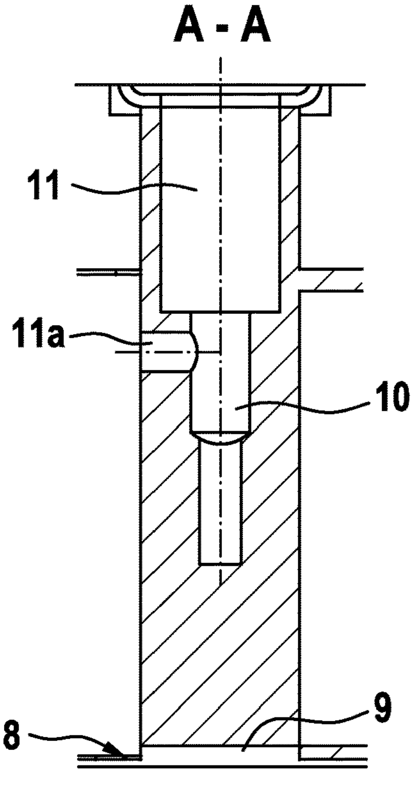
Figure 9:
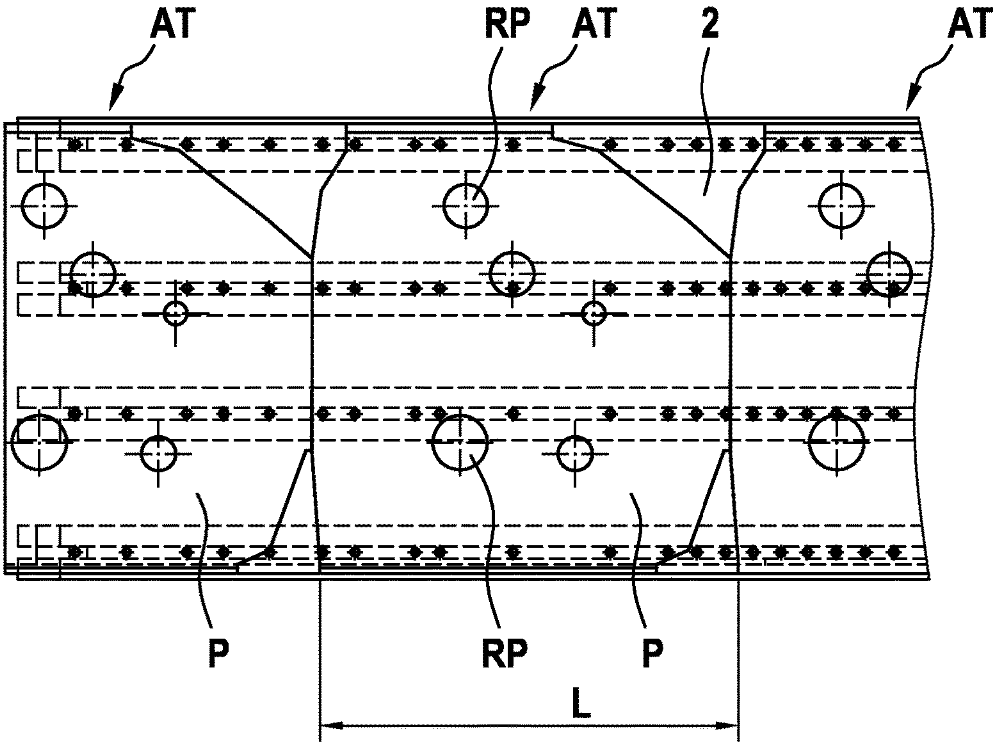
FIG. 9 shows a top view of a first cutting contour of a sheet metal strip 2 in a CAM system. Small residual blanks RP are provided within the blanks P here.

If the residual blanks RP are small (see FIG. 9), no marking takes place. In this case, the residual blanks RP do not adhere to the suction conveyor, but are fed directly from the first conveyor belt 4 to the sliding surface 13 and the downstream shredding device 12.

The markings M1, M2 are processed by the CAM system. In particular, the system calculates which compressed air blast devices are to be controlled for ejecting the respective residual blanks RP. This information is transferred to a machine control system.

The sheet metal strip 2 passes through the laser cutting station 3, where it is cut so that at the outlet of the laser cutting station it has successive sections AT with essentially identical cutting geometry. Each of the sections AT has a predetermined length L or pitch length in the transport direction. Each of the sections AT comprises at least one blank P and at least one residual blank RP adjacent to the blank P (see FIG. 9). The cut sheet metal strip 2 is transported in transport direction T by means of the first conveyor belt 4. The cut sheet metal strip 2 is then taken over by the suction conveyor 5 and transported further in transport direction T. Small residual blanks RP immediately fall onto the sliding surface 13 when the cut sheet metal strip is taken over.

In the first section A1, the suction conveyor 5 has an array of compressed air blast devices extending in the transport direction T as well as in the y-direction. Each of the compressed air blast devices comprises a suction line 10 and a compressed air line 11*a* connected thereto, which can optionally be opened and closed by means of a valve (not shown here). As soon as a residual blank RP is completely overlapped with the first section A1, the control system actuates those compressed air blast devices which are overlapped with the residual blank RP. The compressed air blast devices generate a compressed air impact. As a result, the negative pressure in this area collapses and the residual blank RP falls onto the sliding surface 13. It slides by gravity to the shredding device 12 and is shredded there. The scrap S formed is discharged.

The blanks P, on the other hand, are transported from the first section A1 of the suction conveyor 5 to the second section A2 in a hanging position. As soon as the blanks P are completely overlapped with the second conveyor belt 6, the compressed air blast devices in the second section A2 are activated by means of the control system so that the blanks P are ejected onto the second conveyor belt 6.

The first conveyor belt 4 and the conveyor belts 8 of the suction conveyor 5 are operated at the same rotational speed. The second conveyor belt 6 is advantageously operated at a rotational speed that is greater than the rotational speed of the first conveyor belt 4. As a result, the blanks P discharged from the suction conveyor 5 onto the second conveyor belt 6 are accelerated. They are discharged at a greater distance on the second conveyor belt 6 than they are fed to the suction conveyor 5. This facilitates the handling of the blanks P, in particular their transfer to a stacker or the like.

LIST OF REFERENCE SIGNS

1 conveyor
2 sheet metal strip
3 laser cutting station
4 first conveyor belt
5 suction conveyor
6 second conveyor belt
7 collecting station
7*a* suction conveying device
8 transport belt
9 negative pressure channel
10 suction line
11 intake duct
11*a* compressed air line
12 shredding device
13 sliding surface
A1 first section
A2 second section
AT section
L length
M1 first marker
M2 second marker
P blank
RP residual blank
S scrap
T transport direction

The invention claimed is:

1. A method for separating blanks with the following steps: continuous conveying of a sheet metal strip (2) in a transport direction (T) to a laser cutting station (3), concurrently cutting the sheet metal strip (2) by means of at least one cutting laser, a cut sheet metal strip (2) being formed from successive sections (AT) of the same cutting geometry, each of the sections (AT) comprising at least one blank (P) and at least one residual blank (RP) adjacent to the blank (P), transporting the cut sheet metal strip (2) on a first conveyor belt (4) in the transport direction (T), transfer of the cut sheet metal strip (2) from the first conveyor belt (4) by means of a suction conveyor (5) operated by negative pressure, suspended transport of the cut sheet metal strip (2) by means of the suction conveyor (5) in the transport direction (T), separately ejecting the at least one residual blank (RP) of each section (AT) by first interrupting the negative pressure in predetermined areas of the suction conveyor (5), transporting the at least one blank (P) of each section (AT) into overlap with a second conveyor belt (6) and ejecting the at least one blank (P) from the suction conveyor (5) by a second interruption of the negative pressure, and transporting the blanks (P) discharged one after the other by the suction conveyor (5) in the transport direction (T) to a collecting station (7).

2. The method according to claim 1, wherein the suction conveyor (5) has a plurality of compressed air blast devices (11, 11*a*) for interrupting the negative pressure, which are arranged successively in the transport direction (T) and in a y-direction extending transversely to the transport direction (T), wherein each compressed air blast device (11, 11*a*) can be selectively connected to a compressed air source via a separately controllable valve for generating a compressed air surge.

3. The method according to claim 1, wherein the negative pressure is interrupted by generating at least one compressed air shock produced by means of a compressed air blast device (11, 11*a*).

4. The method according to claim 1, wherein specific compressed air blast devices (11, 11*a*) are selected in dependence on a geometry of the at least one residual blank (RP) in a CAM system set up for the production of the blanks (P) and are transferred to a controller.

5. The method according to claim 1, wherein the selected compressed air blast devices (11, 11*a*) for ejecting the at least one residual blank (RP) are controlled by means of the control system as a function of the transport path of the sheet metal strip (2) for generating a compressed air impact.

6. The method according to claim 1, wherein the residual blanks (RP) are discharged into a residual blank discharge device (12, 13) arranged between the first (4) and the second conveyor belt (6).

7. The method according to claim 1, wherein the residual blank (RP) is crushed in the residual blank discharge device (12, 13).

8. The method according to claim 1, wherein a first transport speed of the first transport belt (4) and the suction conveyor (5) is smaller than a second transport speed of the second transport belt (6).

9. The method according to claim 1, wherein the blanks (P) are stacked in the collecting station (7).

10. Apparatus for separating blanks (P), comprising:

a conveyor (1) for continuously conveying a sheet metal strip (2) in a transport direction (T) to a laser cutting station (3), a laser cutting station (3) having at least one cutting laser for concurrently cutting the sheet metal strip (2) so that a cut sheet metal strip (2) is formed from successive sections (AT) of the same cutting geometry, each of the sections (AT) comprising at least one blank (P) and at least one residual blank (RP) adjacent to the blank (P), a first conveyor belt (4) for transporting the cut sheet metal strip (2) downstream of the laser cutting station (3) in the transport direction (T), a suction conveyor (5) operated by means of negative pressure for taking over the cut sheet metal strip (2) from the first conveyor belt (4) and for transporting the cut sheet metal strip (2) overhead in the transport direction (T), a device (11, 11*a*) for separately ejecting the at least one residual blank (RP) of each section (AT) by first interrupting the negative pressure in predetermined areas of the suction conveyor (5), a second conveyor belt (6) arranged in partial overlap with the suction conveyor (5) for receiving the at least one blank (P) discharged from the suction conveyor (5) by a second interruption of the negative pressure and for transporting the successively discharged blanks (P) horizontally in the transport direction (T) to a collecting station (7).

11. The apparatus according to claim 10, wherein the suction conveyor (5) has a plurality of compressed air blast devices (11, 11*a*) which are arranged successively in the transport direction (T) and in a y-direction extending transversely to the transport direction (T), each of the compressed air blast devices (11, 11*a*) being selectively connectable to a compressed air source via a separately controllable valve for generating a compressed air surge.

12. The apparatus according to claim 10, wherein a CAM system for producing the blanks (P) is set up in such a way that, as a function of a geometry of the at least one residual blank (RP), specific compressed air blast devices (11, 11*a*) can be selected and transferred to a controller.

13. The apparatus according to claim 10, wherein the control is arranged such that the selected compressed air blast devices (11, 11*a*) for ejecting the at least one residual blank (RP) are controlled in dependence on the transport path (T) of the sheet metal strip (2) for generating a compressed air impact.

14. The apparatus according to claim 10, wherein a residual blank removal device (12, 13) for receiving discarded residual blanks (RP) is provided between the first (4) and the second conveyor belt (6).

15. The apparatus according to claim 10, wherein the residual blank removal apparatus (13) comprises means (12) for comminuting the residual blanks (RP).

16. The apparatus according to claim 10, wherein a first transport speed (T) of the first transport belt (4) and the suction conveyor (5) is lower than a second transport speed of the second transport belt (6).

17. The apparatus according to claim 10, wherein at least one stacking device for collecting the blanks (P) is provided downstream of the second conveyor belt (6).

* * * * *